United States Patent
Kamgaing et al.

(10) Patent No.: US 10,439,671 B2
(45) Date of Patent: Oct. 8, 2019

(54) MICROELECTRONIC DEVICES DESIGNED WITH HIGH FREQUENCY COMMUNICATION MODULES HAVING STEERABLE BEAMFORMING CAPABILITY

(71) Applicant: Intel Corporation, Santa Clara, CA (US)

(72) Inventors: Telesphor Kamgaing, Chandler, AZ (US); Georgios C. Dogiamis, Chandler, AZ (US); Vijay K. Nair, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/771,865

(22) PCT Filed: Dec. 21, 2015

(86) PCT No.: PCT/US2015/067190
§ 371 (c)(1),
(2) Date: Apr. 27, 2018

(87) PCT Pub. No.: WO2017/111920
PCT Pub. Date: Jun. 29, 2017

(65) Prior Publication Data
US 2018/0316383 A1   Nov. 1, 2018

(51) Int. Cl.
*H04B 1/44* (2006.01)
*H01Q 21/06* (2006.01)
(Continued)

(52) U.S. Cl.
CPC ............... *H04B 1/44* (2013.01); *H01Q 3/36* (2013.01); *H01Q 3/42* (2013.01); *H01Q 21/06* (2013.01);
(Continued)

(58) Field of Classification Search
CPC . H04B 1/28; H04B 1/44; H04B 1/401; H04B 1/405; H01Q 21/22; H01Q 21/06;
(Continued)

(56) References Cited

U.S. PATENT DOCUMENTS

2005/0014466 A1   1/2005   Park et al.
2006/0223474 A1*  10/2006  Yoshizaki ............ H04B 1/28
                                              455/252.1
(Continued)

OTHER PUBLICATIONS

International Search Report and Written Opinion for International Patent Application No. PCT/US2015/067190 dated Sep. 21, 2016, 14 pgs.
International Preliminary Report on Patentability for PCT Patent Application No. PCT/US2015/067190 dated Jul. 5, 2018, 11 pgs.

*Primary Examiner* — Thanh C Le
(74) *Attorney, Agent, or Firm* — Schwabe, Williamson & Wyatt, P.C.

(57) ABSTRACT

Embodiments of the invention include a communication module that includes a die having a transceiver and a phase shifter die that is coupled to the die. The phase shifter includes a power combiner and splitter. The communication module also includes a substrate that is coupled to the phase shifter die. The substrate includes an antenna unit with steerable beam forming capability for transmitting and receiving communications.

20 Claims, 7 Drawing Sheets

(51) Int. Cl.
*H01Q 3/42* (2006.01)
*H01Q 21/22* (2006.01)
*H04B 1/401* (2015.01)
*H01Q 3/36* (2006.01)
*H01Q 23/00* (2006.01)

(52) U.S. Cl.
CPC ............ *H01Q 21/22* (2013.01); *H01Q 23/00* (2013.01); *H04B 1/401* (2013.01)

(58) Field of Classification Search
CPC ........ H01Q 21/0006; H01Q 3/42; H01Q 3/34; H01Q 23/00
See application file for complete search history.

(56) References Cited

U.S. PATENT DOCUMENTS

| | | | |
|---|---|---|---|
| 2007/0066254 A1* | 3/2007 | Tsuchie | H04B 1/28 455/183.2 |
| 2007/0146207 A1* | 6/2007 | Mohamadi | H01Q 21/0006 343/700 MS |
| 2010/0214170 A1 | 8/2010 | Quan | |
| 2012/0033761 A1 | 2/2012 | Guo et al. | |
| 2013/0113657 A1 | 5/2013 | Behbahani et al. | |
| 2013/0314280 A1 | 11/2013 | Maltsev et al. | |
| 2014/0210668 A1 | 7/2014 | Wang et al. | |
| 2015/0009071 A1 | 1/2015 | Gregoire | |
| 2015/0214615 A1 | 7/2015 | Patel et al. | |
| 2015/0288438 A1 | 10/2015 | Maltsev et al. | |

* cited by examiner

MICROELECTRONIC DEVICES DESIGNED WITH HIGH FREQUENCY COMMUNICATION MODULES HAVING STEERABLE BEAMFORMING CAPABILITY

CROSS-REFERENCE TO RELATED APPLICATION

This patent application is a U.S. National Phase Application under 35 U.S.C. § 371 of International Application No. PCT/US2015/067190, filed Dec. 21, 2015, entitled "MICROELECTRONIC DEVICES DESIGNED WITH HIGH FREQUENCY COMMUNICATION MODULES HAVING STEERABLE BEAMFORMING CAPABILITY," which designates the United States of America, the entire disclosure of which is hereby incorporated by reference in its entirety and for all purposes.

FIELD OF THE INVENTION

Embodiments of the present invention relate generally to the manufacture of semiconductor devices. In particular, embodiments of the present invention relate to microelectronic devices having high frequency communication modules that include steerable beamforming capability.

BACKGROUND OF THE INVENTION

Future wireless products are targeting operation frequencies much higher than the lower GHz range utilized presently. For instance 5G ($5^{th}$ generation mobile networks or $5^{th}$ generation wireless systems) communications is expected to operate at a frequency greater than or equal to 15 GHz. Moreover, the current WiGig (Wireless Gigabit Alliance) products operate at 60 GHz. Other applications including automotive radar and medical imaging, utilize wireless communication technologies in the millimeter wave frequencies (e.g., 30 GHz-300 GHz).

DETAILED DESCRIPTION OF THE INVENTION

Described herein are microelectronic devices that are designed with high frequency communication devices having steerable beamforming capability. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order to not obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

For high frequency (e.g., 5G, WiGig) wireless applications of millimeter (e.g., 1-10 mm, any mm wave) wave communication systems, the designed RF circuits (e.g., low-noise amplifiers, mixers, power amplifiers, etc.) are in need of high quality passive matching networks, in order to accommodate the transmission of pre-defined frequency bands where the communication takes place as well as in need of high efficiency power amplifiers, and low loss, power combiners/switches, etc. CMOS technology for greater than 15 GHz operation can be utilized, but with decreased power amplifier efficiencies and with low quality passives, mainly due to the typically lossy silicon substrate employed. This results not only in a lower system performance, but also in increased thermal requirements due to the excess heat generated. In one example, the high thermal dissipation is due to the fact that multiple power amplifiers have to be utilized in a phased array arrangement to achieve the desired output power and transmission range. This will be even more stringent on 5G systems as the typical transmission range for cellular network (e.g., 4G, LTE, LTE-Adv) is several times larger than that required for connectivity (e.g., WiFi, WiGig).

The present design efficiently partitions high frequency components (e.g., 5G transceiver) and utilizes non-CMOS technologies (e.g., non-silicon substrates) for critical parts of a communication system (e.g., GaAs, GaN, Passives-on-Glass, etc.). With an optimal system partitioning, critical parts requiring high efficiencies and high quality factors can be fabricated on another technology (e.g., compound semiconductor materials, group III-V materials). These parts might be either on device level (e.g., transistors on GaN/GaAs) or on circuit level (e.g., III-V die integrating a power amplifier, a low noise amplifier, etc.). The full communication system will be formed in a package-fabric or die-fabric manner, as discussed in embodiments of this invention.

The present design technology allows co-integrating dies and/or devices that are fabricated on different technologies and/or substrates on the same package for performance enhancement and relaxation of thermal requirements. The package might include antenna units for communication with other wireless systems.

In one embodiment, the present design is a 5G ($5^{th}$ generation mobile networks or $5^{th}$ generation wireless systems) architecture having non-CMOS based transceiver building blocks (such as group III-V based devices or dies) that are co-integrated on the same package with low frequency circuits and integrated passive devices (IPDs) for performance enhancement and thermal requirements relaxation. In this arrangement, each component is assembled directly in the package. The package may have antennas directly integrated onto it. The 5G architecture operates at a high frequency (e.g., at least 20 GHz, at least 25 GHz, at least 28 GHz, at least 30 GHz, etc.) and may also have approximately 1-50 gigabits per second (Gbps) connections to end points. In another example, the present design operates at lower frequencies (e.g., at least 4 GHz, approximately 4 GHz).

For both mobile and base station units operating in a 5G architecture, beam forming is critical. In the base station, multiple beams have to be generated simultaneously to cover different spaces and users. For a mobile unit, adding beam forming can improve both data rate and transmission range as well as enable wider communication angles between base station and mobile unit. For 5G wireless communication modules that utilize group III-V circuitry (e.g., GaN amplifiers), the output power is projected to be large enough to support most short and medium range transmissions using an isotropic antenna. However, an optimal power utilization will likely not be achieved with omnidirectional or isotropic signal propagation. The present design includes a transceiver architecture employing beam steering capability for transmit chains with a single power amplifier and/or receive chains with a single low noise amplifier. The use of a power amplifier, which is formed on a group III-V substrate or die, having a high output power reduces overall power losses within the architecture and improves efficiency in comparison to beam forming implemented with CMOS devices. The beam forming capability of the present design enables the channeling of power towards specific receivers and also improves transmission range and data rate versus isotropic power radiation. In one example, the implementation of phase shifters and power combiners on an integrated passive device or die (IPD) leads to cost reduction while minimizing tolerances associated with passives on organic package substrates. Passive components (e.g., inductors, capacitors, etc.) integrated on an IPD have a lower cost in comparison to integrating passive components on group III-V substrates or dies. The present design also includes a flexibility to combine different technologies on a single communication module.

Figure 1:
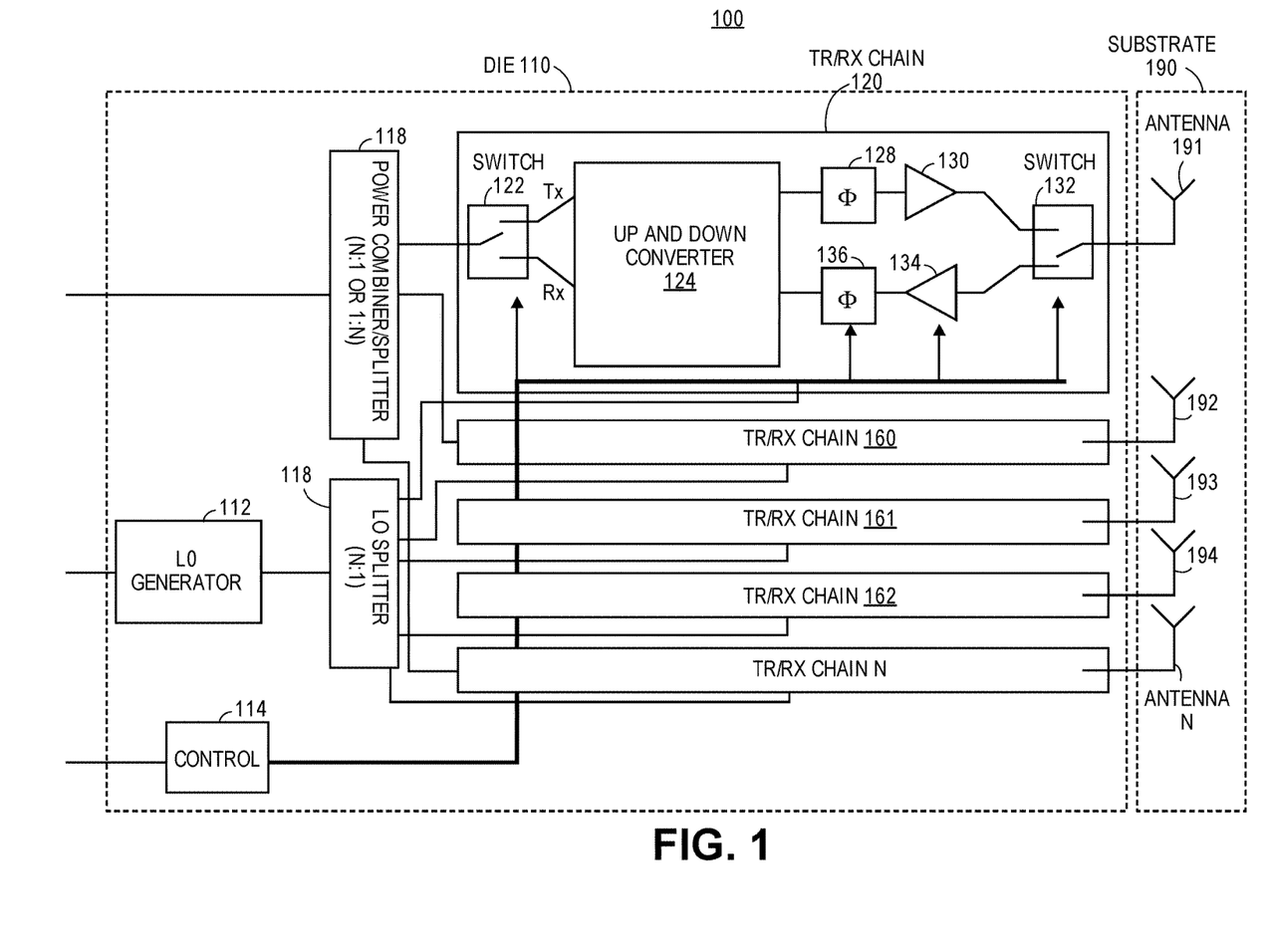
FIG. 1 illustrates a communication module having multiple transmit/receive (Tx/Rx) chains in accordance with one implementation.

FIG. 1 illustrates a communication module (e.g., a transceiver module) having multiple transceivers for beam forming in accordance with one implementation. The transceiver module 100 includes a CMOS die 110 and a substrate 190 (e.g., package substrate) having antennas 191-194, . . . N. The antennas form one or more phased antenna arrays. The CMOS die 110 includes communications circuitry or devices (e.g., at least one transceiver unit, complementary metal-oxide-semiconductor (CMOS) circuitry, CMOS circuitry having at least one baseband unit and at least one transceiver unit formed with a silicon based substrate) including an LO generator 112, a splitter 118, a power/combiner 118, a control unit 114, and transmit/receive chains 120, 160, 161, 162, . . . N. Each transmit/receive chain can be an independent transceiver and each transmit/receive chain can have a different phase set by the phase shifters. The transmit/receive chain 120 includes switches 122 and 132, an up and down converter 124 (e.g., an up and down converter having at least one intermediate frequency amplifier and at least one mixer), phase shifters 128 and 136, a power amplifier 130 and a low noise amplifier 134. The other transmit/receive chains include similar components in comparison to the transmit/receive chain 120. The module 100 includes a mm wave phased array module. Multiple transmit/receive chains (e.g., transceivers) are needed for beam forming. Power combiners and splitters are integrated on the CMOS die 110. Each transmit/receive chain has a certain power consumption during a transmit mode and a certain power consumption during a receive mode.

In one example, the present design introduces power splitters and phase shifters at the output of a power amplifier having high output power (e.g., a power amplifier formed in a group III-V substrate or die). The output signal from the power amplifier is initially split and then recombined through phase shifting to enable steerable beams.

Figure 2:
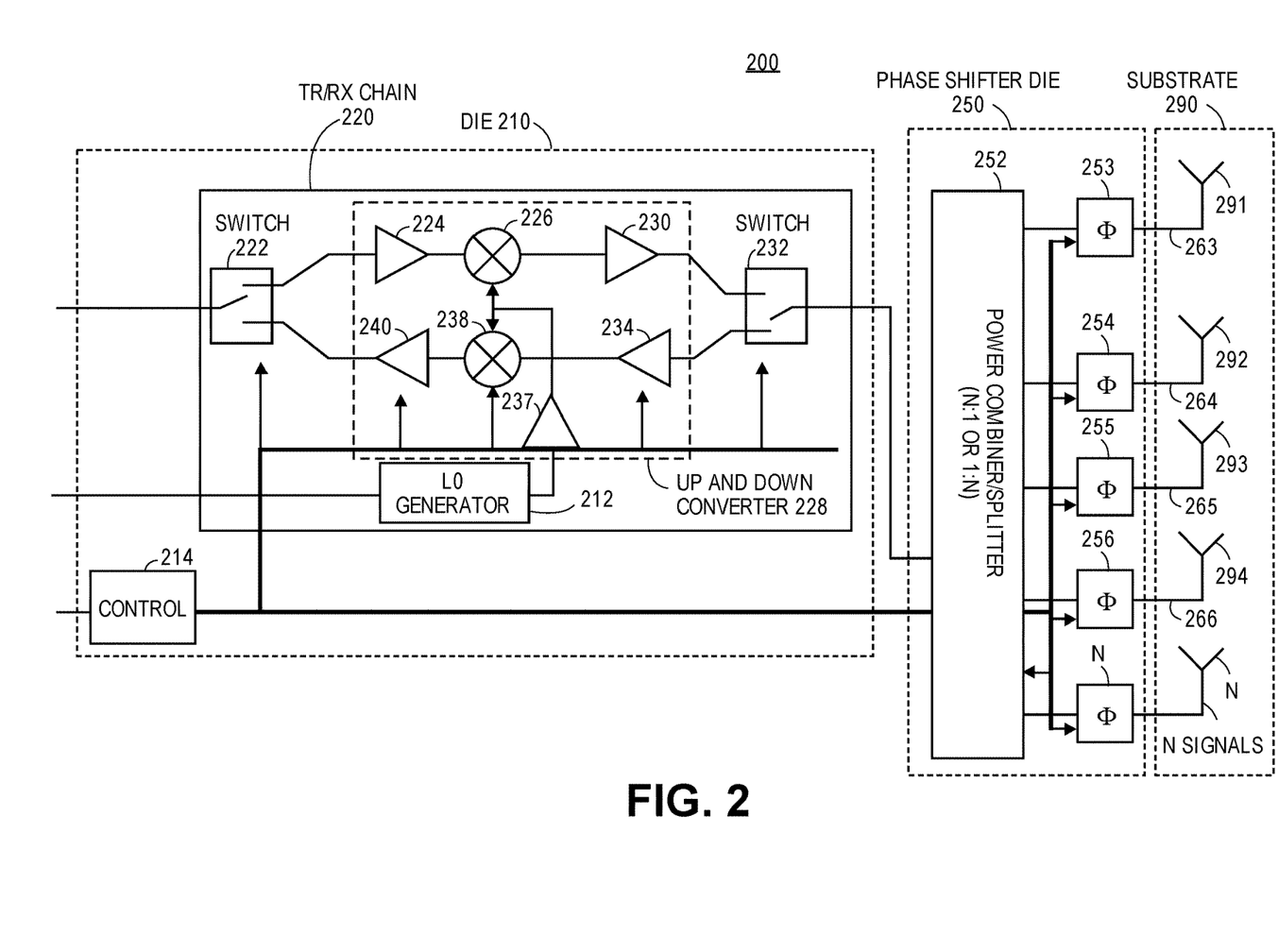
FIG. 2 illustrates a communication module (e.g., transceiver module) having a single transmit/receive chain for beam forming in accordance with one embodiment.

FIG. 2 illustrates a communication module (e.g., transceiver module, microelectronic device) having a single transmit/receive chain for beam forming in accordance with one embodiment. The communication module 200 includes a CMOS die 210, an IPD 250, and a substrate 290 (e.g., package substrate) having antennas 291-294 . . . N. The antennas form one or more phased antenna arrays. The CMOS die 210 includes communications circuitry or devices (e.g., a transceiver unit, complementary metal-oxide-semiconductor (CMOS) circuitry, CMOS circuitry formed with a silicon based substrate) including a control unit 214 for generating control signals and a transmit/receive chain 220 (e.g., transceiver 220) for transmitting or receiving communication signals. The transmit/receive chain 220 includes switches 222 and 232 for switching between transmit and receive modes, an local-oscillator (LO) generator 212 to generate an output frequency, an up and down converter 228 (e.g., an up and down converter 228 having intermediate frequency (IF) amplifiers 224, 240, and 237, mixers 226 and 238) for shifting a frequency spectrum of signals, a power amplifier 230 for amplifying signals, and a low noise amplifier 234 for amplifying signals without adding noise or minimal added noise.

The phase shifter die 250 includes a power combiner/splitter 252 (e.g., N:1 signals, 1:N signals), phase shifters 253-256, . . . N, and optionally includes switches that are either assembled or monolithically integrated to the phase shifter die. The phase shifters receive control signals from control unit 214. The module 200 includes a mm wave phased array module. A single transmit/receive chain (e.g., transceiver) provides beam forming with reduced power consumption.

During a transmit mode, the switch 222 couples to IF amplifier 224 and the switch 232 couples to the power amplifier 230. At least one data signal to be transmitted is sent from the switch 222 to the IF amplifier 224 which generates at least one output signal that is received by the mixer 226. The mixer 226 shifts a frequency spectrum of the at least output signal and generates at least one output signal that is amplified by the power amplifier 230. The at least one amplified signal is split by a power splitter 252 into signals to be sent to the phase shifters 252-256, . . . N. Optionally, amplifiers may be added after the splitter 252 if necessary to amplify signals to be sent to the phase shifters 252-256. The phase shifters 253-256 . . . N shift a phase of received signals and generate phase shifted signals 263-266, . . . N respectively. The phase shifted signals 263-266, . . . N are used to define an electromagnetic beam that emanates from antennas 291-294, . . . N.

During a receive mode, the splitter operates as a power combiner upon receiving signals via the phase shifters and antennas. The received signals are combined and sent to the switch 232 which couples to the low noise amplifier 234 for amplification. An output signal of the low noise amplifier is sent to the mixer 238 which can shift a frequency spectrum and then output this output signal to the IF amplifier 240. The IF amplifier 240 then generates an output receive signal to be the output by the receive chain 220 of the transceiver.

In one example, the additional switches and combiners may be added as desired for transmitting and receiving simultaneously.

In another example, the low noise amplifier 234 and power amplifier 230 compensate for an insertion loss (e.g., approximately 2 db) of the power combiner/splitter 252.

Figure 3:
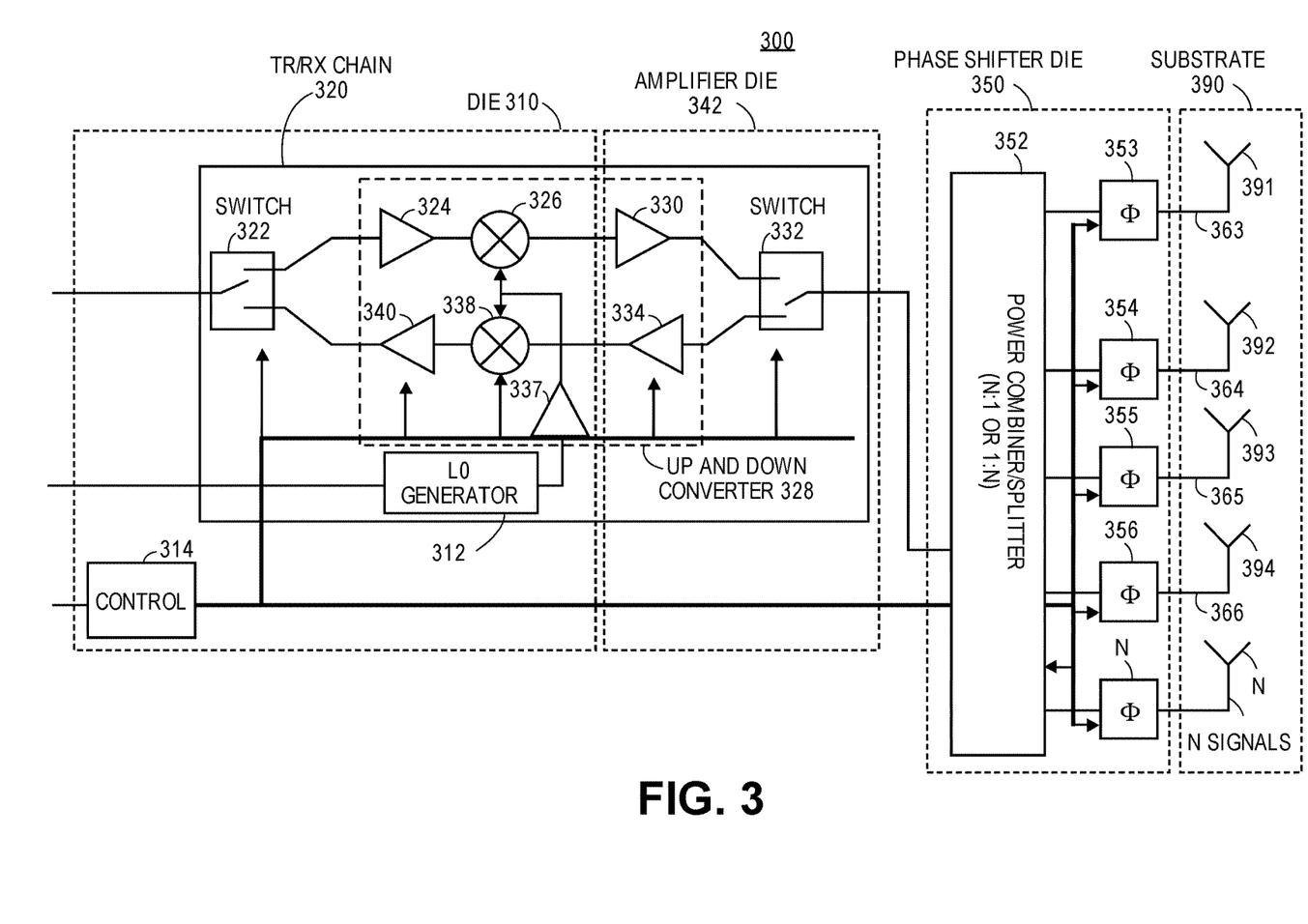
FIG. 3 illustrates a communication module having a single transmit/receive chain in accordance with one embodiment.

FIG. 3 illustrates a communication module (e.g., transceiver module, microelectronic device) having a single transceiver for beam forming in accordance with one embodiment. The communication module 300 (e.g., a transceiver module 300) includes a silicon based die 310 and an amplifier die 342 formed with compound semiconductor materials (e.g., group III-V materials, GaN, GaAs, etc.) in a separate die or substrate or integrated with the die 310. The module 300 also includes a phase shifter die 350 and a substrate 390 (e.g., package substrate) having antennas 391-394, . . . N. The antennas form one or more phased antenna arrays. The die 310 includes communications circuitry or devices (e.g., a transceiver unit, complementary metal-oxide-semiconductor (CMOS) circuitry, CMOS circuitry formed with a silicon based substrate, CMOS circuitry formed with silicon substrate) including a control unit 314 for generating control signals and a first portion of a transmit/receive chain 320 (e.g., transceiver 320) for transmitting or receiving communication signals. The first portion of the transmit/receive chain 320 includes a switch 322 for switching between transmit and receive modes, an LO generator 312 to generate an output frequency, an up and down converter 328 (e.g., an up and down converter 328 having intermediate frequency (IF) amplifiers 324, 340, and 337, mixers 326 and 338) for shifting a frequency spectrum of signals. A second portion of the transmit/receive chain 320 is formed in the die 342 (e.g., compound semiconductor die, GaN die) that includes a power amplifier 330 for amplifying signals, a low noise amplifier 337 for amplifying signals without adding noise or with adding minimal noise, and a switch 332 for switching between transmit and receive modes.

The phase shifter die 350 includes a power combiner/splitter 352 (e.g., N:1 signals, 1:N signals) and phase shifters 353-356, . . . N and optionally includes switches. The phase shifters receive control signals from control unit 314 for control of the phase shifters including phase shift for each phase shifter. The module 300 includes a mm wave phased array module. A single transmit/receive chain (e.g., transceiver) provides beam forming with reduced power consumption.

During a transmit mode, the switch 322 couples to IF amplifier 324 and the switch 332 couples to the power amplifier 330. At least one data signal to be transmitted is sent from the switch 322 to the IF amplifier 324 which generates at least one output signal that is received by the mixer 326. The mixer 326 shifts a frequency spectrum of the at least output signal and generates at least one output signal that is amplified by the power amplifier 330. The at least one amplified signal is split by a power splitter 352 into signals to be sent to the phase shifters 353-356, . . . N. The phase shifters 353-356 . . . N shift a phase of received signals and generate phase shifted signals 363-366, . . . N respectively. The phase shifted signals 363-366, . . . N are used to define an electromagnetic beam that emanates from antennas 391-394, . . . N.

During a receive mode, the splitter operates as a power combiner upon receiving signals via the phase shifters and antennas. The received signals are combined and sent to the switch 332 which couples to the low noise amplifier 334 for amplification. An output signal of the low noise amplifier is sent to the mixer 338 which can shift a frequency spectrum and then output this output signal to the IF amplifier 340. The IF amplifier 340 then generates an output receive signal to be output by the receiver chain 320 of the transceiver.

Figure 4:
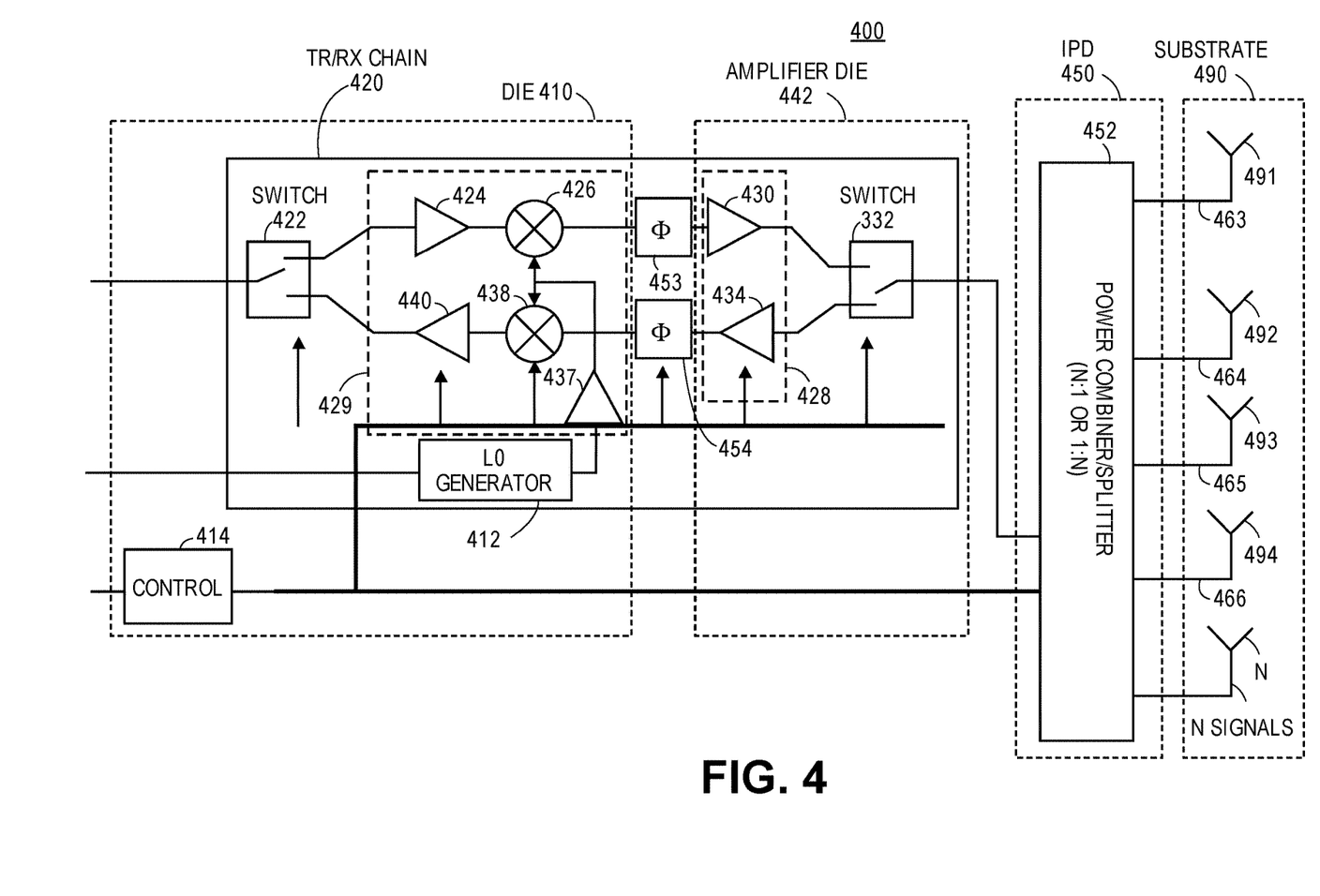
FIG. 4 illustrates a communication module having a single transmit/receive chain in accordance with another embodiment.

FIG. 4 illustrates a communication module (e.g., transceiver module) having a single transceiver for beam forming in accordance with another embodiment. The communication module 400 (e.g., a transceiver module 400) includes a silicon based die 410 and an amplifier die 440 formed with compound semiconductor (e.g., group III-V materials, GaN, GaAs, etc.) in a separate die or substrate or integrated with the die 410. The module 400 includes similar components in comparison to the module 300 except that the phase shifters have been moved to the transmit/receive chain. The module 400 also includes an IPD 450 and a substrate 490 (e.g., package substrate) having antennas 491-494, . . . N. The antennas form one or more phased antenna arrays. The die 410 includes communications circuitry or devices (e.g., a transceiver unit, complementary metal-oxide-semiconductor (CMOS) circuitry, CMOS circuitry formed with a silicon based substrate, CMOS circuitry formed with silicon substrate) including a control unit 414 for generating control signals and a first portion of a transmit/receive chain 420 (e.g., transceiver 420) for transmitting or receiving communication signals. The first portion of the transmit/receive chain 420 includes a switch 422 for switching between transmit and receive modes, an LO generator 412 to generate an output frequency, up and down converters 428 and 429 (e.g., up and down converters having intermediate frequency (IF) amplifiers 424, 440, and 437, mixers 426 and 438) for shifting a frequency spectrum of signals and optionally phase shifters 453 and 454 for shifting phases of the signals received by the phase shifters. The phase shifters receive control signals from control unit 414. Alternatively, the phase shifters can be located on the die 442. In an another embodiment, the phase shifters are located on a separate die. A second portion of the transmit/receive chain 420 is formed in the die 442 (e.g., compound semiconductor die, GaN die) that includes a power amplifier 430 for amplifying signals, a low noise amplifier 437 for amplifying signals without adding noise or with minimal added noise, a switch 432 for switching between transmit and receive modes, and optionally phase shifters 453 and 454 for shifting phases of the signals received by the phase shifters.

The IPD 450 includes a power combiner/splitter 452 (e.g., N:1 signals, 1:N signals) and and optionally includes switches. The module 400 includes a mm wave phased array module. A single transmit/receive chain (e.g., transceiver) provides beam forming with reduced power consumption.

During a transmit mode, the switch 422 couples to IF amplifier 424 and the switch 432 couples to the power amplifier 430. At least one data signal to be transmitted is sent from the switch 422 to the IF amplifier 424 which generates at least one output signal that is received by the mixer 426. The mixer 426 shifts a frequency spectrum of the at least one output signal and generates at least one output signal that is shifted in phase by phase shifters and then amplified by the power amplifier 430. The at least one amplified signal is split by a power splitter 452 into signals to be amplified by N different amplifiers and then sent to the antennas 491-494, . . . N.

During a receive mode, the splitter operates as a power combiner upon receiving signals from the antennas. The received signals are combined and sent to the switch 432 which couples to the low noise amplifier 434 for amplification. An output signal of the low noise amplifier is then phase shifted by the phase shifters and then sent to the mixer 438 which can shift a frequency spectrum and then output this output signal to the IF amplifier 440. The IF amplifier 440 then generates an output receive signal to be output by the transceiver 420.

Figure 5:
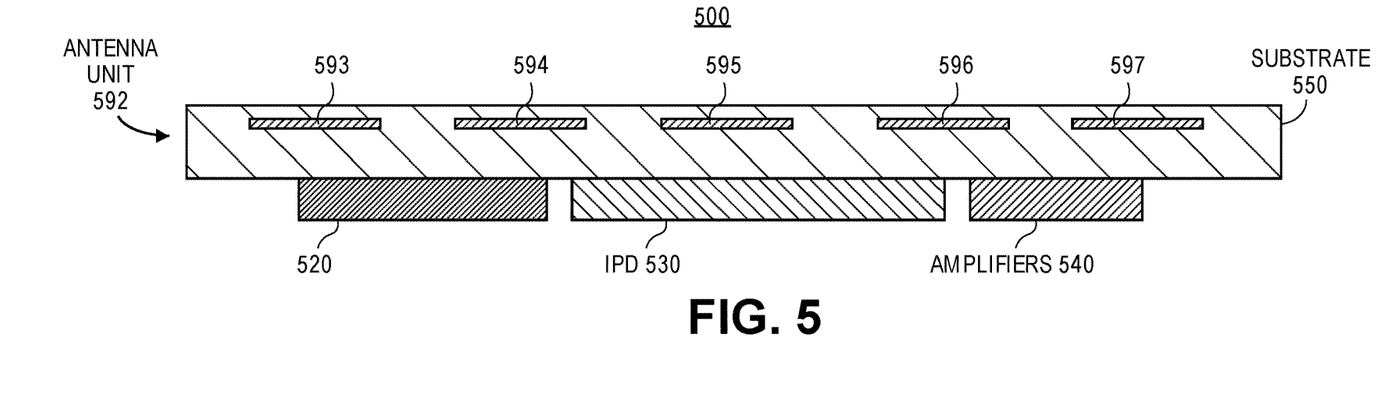
FIG. 5 illustrates co-integrating different components in a microelectronic device (e.g., a package fabric architecture) having a substrate with an integrated antenna unit and a transceiver component coupled to the substrate in accordance with one embodiment.

FIG. 5 illustrates co-integrating different components in a microelectronic device (e.g., a communication module) having a substrate with an integrated antenna unit and transceiver components coupled to substrate (e.g., package substrate) in accordance with one embodiment. The microelectronic device 500 includes a substrate 550 (e.g., package substrate 550) having an integrated antenna unit 592, a CMOS die 520 (e.g., CMOS circuitry, CMOS driver circuitry, etc.) and an IPD 530 that includes similar components in comparison to the IPDs 252, 352, and 452. In one example, the IPD 530 includes a power combiner/splitter, phase shifters, and optionally switches. The device 500 also includes amplifier circuitry 540 that includes different types of amplifiers (e.g., power amplifiers, low noise amplifiers, etc.) formed with group III-V materials in a substrate or die (e.g., GaN die or substrate, etc.). The die 520, IPD 530, and amplifier circuitry 540 are coupled or attached (e.g., wire bonding, flip-chipping, embedded, etc.) on the package substrate to form at least one transceiver module or unit. The substrate 550 includes conductive layers 593-597 and additional conductive layers. In one example, the conductive layers 593-597 form one or more phased antenna arrays and an additional conductive layers (not shown) can be a ground plane and routing layers. The at least one die 520 includes communications circuitry or devices (e.g., complementary metal-oxide-semiconductor (CMOS) circuitry, transceiver 220, transceiver 320, transceiver 420, CMOS circuitry having at least one baseband unit and at least one transceiver unit formed with a silicon based substrate, CMOS die, devices formed with compound semiconductor materials, group III-V materials, gallium arsenide (GaAs), gallium nitride (GaN), IF amplifiers, low noise amplifiers, power amplifiers, switches, mixers, etc.). The package substrate 550 may also embed potential passives for the die 520 (or other structures, e.g., for shielding). The substrate 550, die 520, and amplifier circuitry 540 can have different thicknesses, lengths, and width dimensions in comparison to the thicknesses, lengths, and width dimensions illustrated in FIG. 5.

The die 520, IPD 530, and amplifier circuitry 540 can be attached to the package substrate 550 using solder balls or bumps or can be embedded within the substrate 550 using solder balls or bumps. In some embodiments connectors or pins may be used to connect electrically these components. Similarly metal to metal bumps may be used in place of solder bumps. The package may have a second level interconnect (SLI) to couple the signals between the package and the platform board.

Antenna signals routing through the package substrate 550 can have a shortest available routing distance. The package substrate 550 may include IPDs and can communicate signals at a high data rate (e.g., at least 1 Gb/second, etc.).

In one example, components of the substrate 550 which primarily dominate a packaging area are partitioned in a separate lower cost and lower circuit density substrate 550 in comparison to the die 520, which may have high density interconnect (HDI) and impedance controlled interconnect. The substrate 550 may be formed with low temperature co-fired ceramic materials, liquid crystal polymers, organic materials, glass, undoped silicon, etc. The substrate 550 can be designed without HDI PCB technologies to save cost. In this manner, an area of the die 520 without antenna components is reduced to reduce cost in comparison to a planar structure that includes antenna components. The die 520 may be formed with any materials (e.g., organic materials, laminate substrates, materials for formation of CPUs, etc) that are designed for high frequency designs having desirable high frequency characteristics (e.g., substrate loss, dielectric constant). The die 520 may include complementary metal-oxide-semiconductor (CMOS) circuitry (e.g., CMOS circuitry having at least one baseband unit and at least one transceiver unit formed with a silicon based substrate, CMOS die) or devices formed with compound semiconductor materials (e.g., group III-V materials, gallium arsenide (GaAs), gallium nitride (GaN), compound semiconductor die, etc.).

In another embodiment, any of the devices or components can be coupled to each other.

Figure 6:
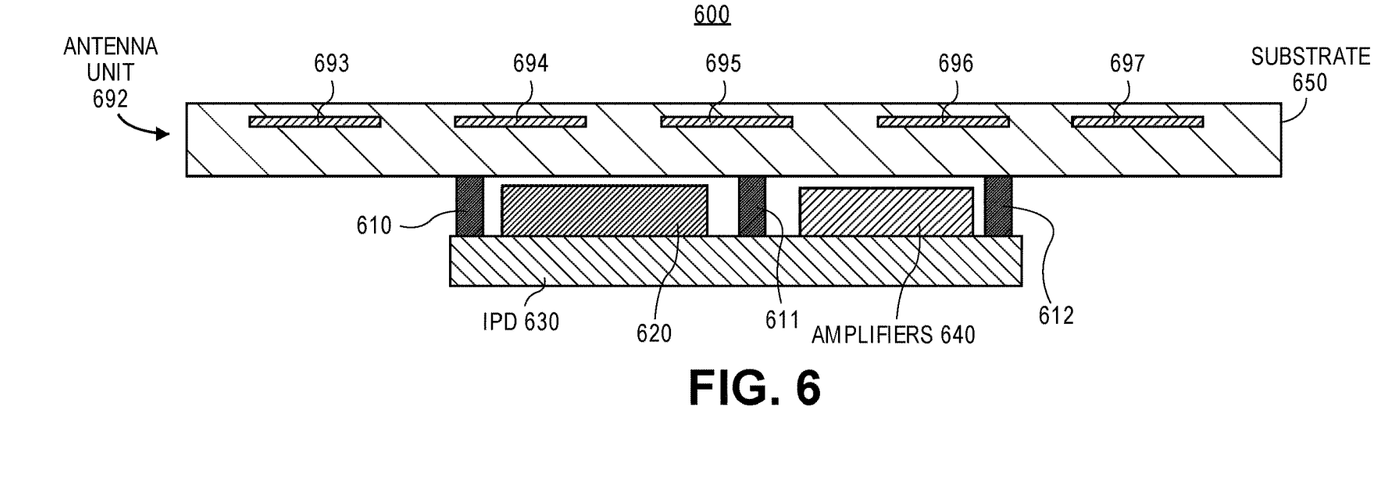
FIG. 6 illustrates co-integrating different components in a microelectronic device (e.g., a communication module) having a substrate with an integrated antenna unit and transceiver components coupled to substrate (e.g., package substrate) in accordance with one embodiment.

FIG. 6 illustrates co-integrating different components in a microelectronic device (e.g., a communication module) having a substrate with an integrated antenna unit and transceiver components coupled to substrate (e.g., package substrate) in accordance with one embodiment. The microelectronic device 600 includes a substrate 650 (e.g., package substrate 650) having an integrated antenna unit 692, a CMOS die 620 (e.g., CMOS circuitry, CMOS driver circuitry, etc.) and an IPD 630 that includes similar components in comparison to the IPDs 252, 352, and 452. In one example, the IPD 630 includes a power combiner/splitter, phase shifters, and optionally switches. The device 600 also includes amplifier circuitry 640 that includes different types of amplifiers (e.g., power amplifiers, low noise amplifiers, etc.) formed with group III-V materials in a substrate or die (e.g., GaN die or substrate, etc.). The die 620 and amplifier circuitry 640 are coupled or attached (e.g., wire bonding, flip-chipping, embedded, etc.) on the IPD 630 which is then coupled or attached to the package substrate to form at least one transceiver module or unit. The substrate 650 includes conductive layers 693-697 and additional conductive layers. In one example, the conductive layers 693-697 form one or more phased antenna arrays and additional conductive layers (not shown) can be a ground plane and routing layers. The at least one die 620 includes communications circuitry or devices (e.g., complementary metal-oxide-semiconductor (CMOS) circuitry, transceiver 220, transceiver 320, transceiver 420, CMOS circuitry having at least one baseband unit and at least one transceiver unit formed with a silicon based substrate, CMOS die, devices formed with compound semiconductor materials, group III-V materials, gallium arsenide (GaAs), gallium nitride (GaN), IF amplifiers, low noise amplifiers, power amplifiers, switches, mixers, etc.). The package substrate 650 may also embed potential passives for the die 620 (or other structures, e.g., for shielding). The substrate 650, die 620, and amplifier circuitry 640 can have different thicknesses, lengths, and width dimensions in comparison to the thicknesses, lengths, and width dimensions illustrated in FIG. 5.

The IPD 630 can be attached to the package substrate 650 using solder balls or bumps 610-612 or can be embedded within the substrate 650 using solder balls or bumps. In some embodiments connectors or pins may be used to connect electrically these components. Similarly metal to metal bumps may be used in place of solder bumps.

Antenna signals routing through the package substrate 650 can have a shortest available routing distance. The package substrate 650 may include IPDs and can communicate signals at a high data rate (e.g., at least 1 Gb/second, etc.).

In one example, components of the substrate 650 which primarily dominate a packaging area are partitioned in a separate lower cost and lower circuit density substrate 650 in comparison to the die 620, which may have high density interconnect (HDI) and impedance controlled interconnect. The substrate 650 may be formed with low temperature co-fired ceramic materials, liquid crystal polymers, organic materials, glass, undoped silicon, etc. The substrate 650 can be designed without HDI PCB technologies to save cost. In this manner, an area of the die 620 without antenna components is reduced to reduce cost in comparison to a planar structure that includes antenna components. The die 620 may be formed with any materials (e.g., organic materials, laminate substrates, materials for formation of CPUs, etc) that are designed for high frequency designs having desirable high frequency characteristics (e.g., substrate loss, dielectric constant). In another embodiment, any of the devices or components can be coupled to each other.

Figure 7:
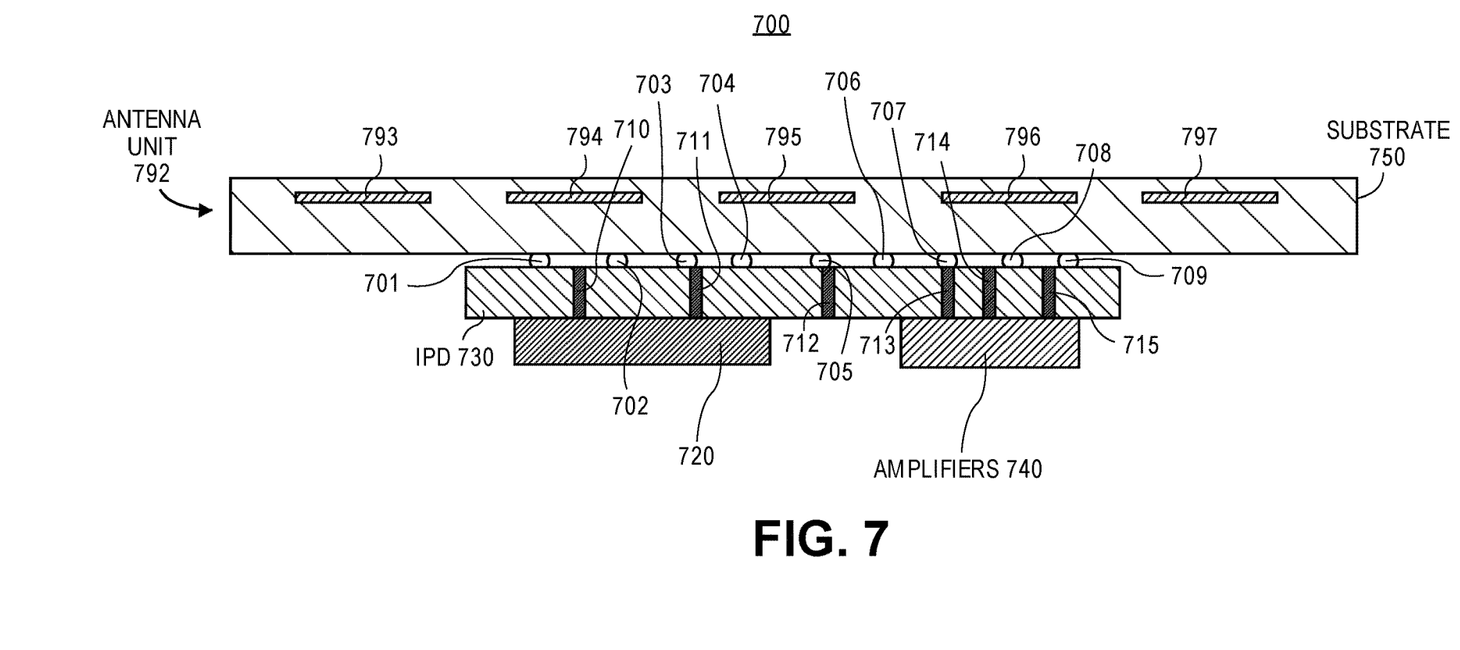
FIG. 7 illustrates co-integrating different components in a microelectronic device (e.g., a communication module) having a substrate with an integrated antenna unit and transceiver components coupled to substrate (e.g., package substrate) in accordance with one embodiment.

FIG. 7 illustrates co-integrating different components in a microelectronic device (e.g., a communication module) having a substrate with an integrated antenna unit and transceiver components coupled to substrate (e.g., package substrate) in accordance with one embodiment. The microelectronic device 700 includes a substrate 750 (e.g., package substrate 750) having an integrated antenna unit 792, a CMOS die 720 (e.g., CMOS circuitry, CMOS driver circuitry, etc.) and an IPD 730 that includes similar components in comparison to the IPDs 252, 352, and 452. In one example, the IPD 730 includes a power combiner/splitter, phase shifters, and optionally switches. The device 700 also includes amplifier circuitry 740 that includes different types of amplifiers (e.g., power amplifiers, low noise amplifiers, etc.) formed with group III-V materials in a substrate or die (e.g., GaN die or substrate, etc.). The die 720, IPD 730, and amplifier circuitry 740 are coupled or attached (e.g., wire bonding, flip-chipping, embedded, etc.) on the package substrate to form at least one transceiver module or unit. The substrate 750 includes conductive layers 793-797 and additional conductive layers. In one example, the conductive layers 793-797 form one or more phased antenna arrays and additional conductive layer (not shown) can be a ground plane and routing layers. The at least one die 720 includes communications circuitry or devices (e.g., complementary metal-oxide-semiconductor (CMOS) circuitry, transceiver 220, transceiver 320, transceiver 420, CMOS circuitry having at least one baseband unit and at least one transceiver unit formed with a silicon based substrate, CMOS die, devices formed with compound semiconductor materials, group III-V materials, gallium arsenide (GaAs), gallium nitride (GaN), IF amplifiers, low noise amplifiers, power amplifiers, switches, mixers, etc.). The package substrate 750 may also embed potential passives for the die 720 (or other structures, e.g., for shielding). The substrate 750, die 720, and amplifier circuitry 740 can have different thicknesses, lengths, and width dimensions in comparison to the thicknesses, lengths, and width dimensions illustrated in FIG. 5.

The die 720, IPD 730, and amplifier circuitry 740 can be attached to each other or to the package substrate 750 using solder balls or bumps or can be embedded within the substrate 750 using solder balls or bumps. In one example, the IPD 730 is attached to the substrate 750 using solder balls or bumps 701-709. In some embodiments connectors or pins may be used to connect electrically these components. Similarly metal to metal bumps may be used in place of solder bumps. The IPD 730 may include thru die or substrate connections 710-715 for routing signals from the die 720 and amplifier circuitry 740 to the substrate 750.

Antenna signals routing through the package substrate 750 can have a shortest available routing distance. The package substrate 750 may include IPDs and can communicate signals at a high data rate (e.g., at least 1 Gb/second, etc.).

In another embodiment, any of the devices or components can be coupled to each other.

It will be appreciated that, in a system on a chip embodiment, the die may include a processor, memory, communications circuitry and the like. Though a single die is illustrated, there may be none, one or several dies included in the same region of the wafer.

In one embodiment, the microelectronic device may be a crystalline substrate formed using a bulk silicon or a silicon-on-insulator substructure. In other implementations, the microelectronics device may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. Although a few examples of materials from which the substrate may be formed are described here, any material that may serve as a foundation upon which a semiconductor device may be built falls within the scope of embodiments of the present invention.

Figure 8:
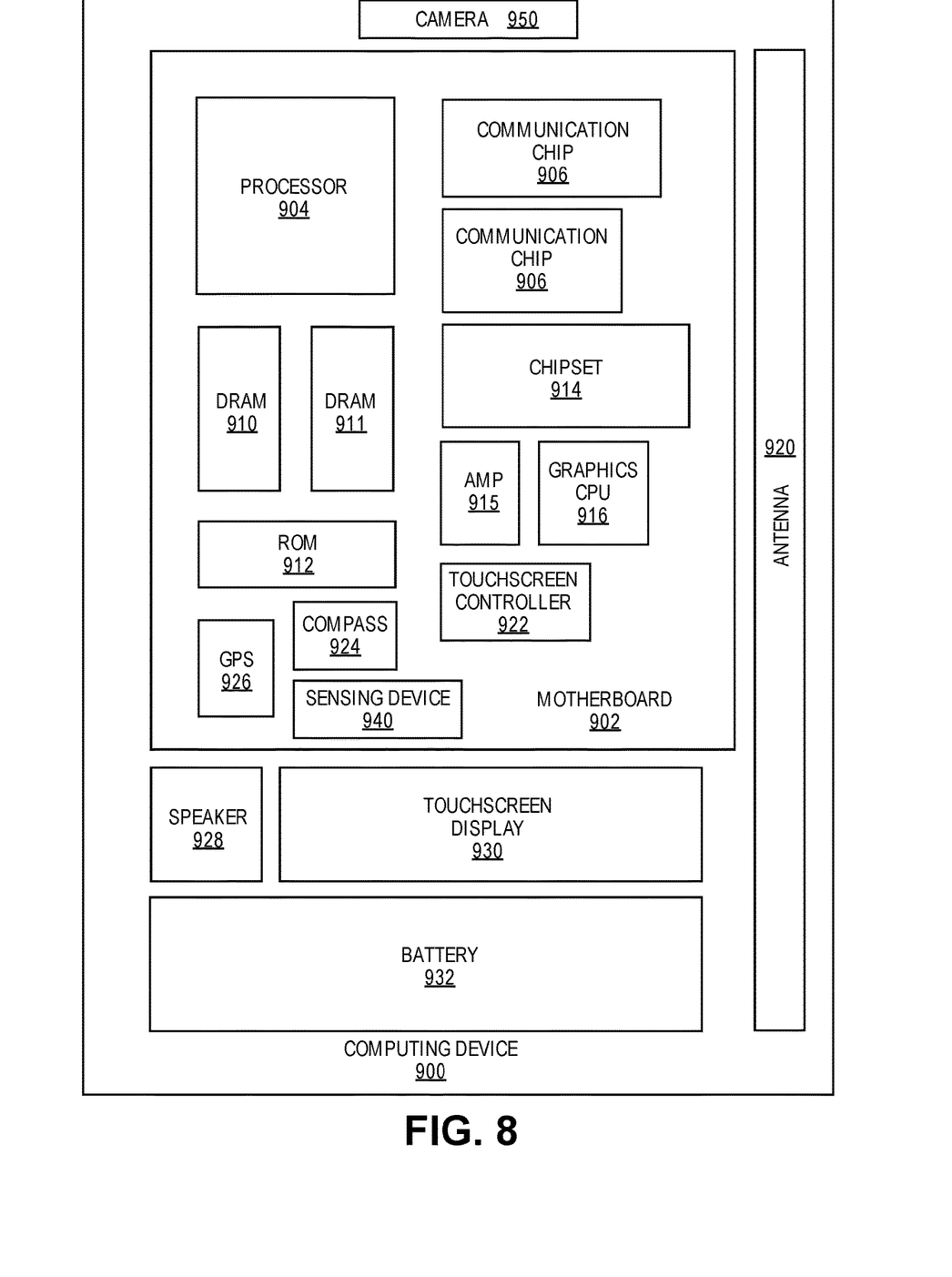
FIG. 8 illustrates a computing device 900 in accordance with one embodiment.

FIG. 8 illustrates a computing device 900 in accordance with one embodiment of the invention. The computing device 900 houses a board 902. The board 902 may include a number of components, including but not limited to at least one processor 904 and at least one communication chip 906. The at least one processor 904 is physically and electrically coupled to the board 902. In some implementations, the at least one communication chip 906 is also physically and electrically coupled to the board 902. In further implementations, the communication chip 906 is part of the processor 904. In one example, the communication chip 906 (e.g., communication module 100, communication module 200, communication module 300, communication module 400, microelectronic device 500, microelectronic device 600, microelectronic device 700, etc.) includes an antenna unit 920.

Depending on its applications, computing device 900 may include other components that may or may not be physically and electrically coupled to the board 902. These other components include, but are not limited to, volatile memory (e.g., DRAM 910, 911), non-volatile memory (e.g., ROM 912), flash memory, a graphics processor 916, a digital signal processor, a crypto processor, a chipset 914, an antenna unit 920, a display, a touchscreen display 930, a touchscreen controller 922, a battery 932, an audio codec, a video codec, a power amplifier 915, a global positioning system (GPS) device 926, a compass 924, a gyroscope, a speaker, a camera 950, and a mass storage device (such as hard disk drive, compact disk (CD), digital versatile disk (DVD), and so forth).

The communication chip 906 enables wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 906 may implement any of a number of wireless standards or protocols, including but not limited to Wi-Fi (IEEE 802.11 family), WiMAX (IEEE 802.16 family), WiGig, IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 900 may include a plurality of communication chips 906. For instance, a first communication chip 906 may be dedicated to shorter range wireless communications such as Wi-Fi, WiGig, and Bluetooth and a second communication chip 906 may be dedicated to longer range wireless communications such as GPS, EDGE, GPRS, CDMA, WiMAX, LTE, Ev-DO, 5G, and others.

The at least one processor 904 of the computing device 900 includes an integrated circuit die packaged within the at least one processor 904. In some implementations of the invention, the integrated circuit die of the processor includes one or more devices, such as microelectronic devices (e.g., microelectronic device 100, 200, 300, 400, 500, 600, 700, etc.) in accordance with implementations of embodiments of the invention. The term "processor" may refer to any device or portion of a device that processes electronic data from registers and/or memory to transform that electronic data into other electronic data that may be stored in registers and/or memory. The communication chip 906 also includes an integrated circuit die packaged within the communication chip 906. In accordance with another implementation of embodiments of the invention, the integrated circuit die of the communication chip includes one or more communication modules or microelectronic devices (e.g., 100, 200, 300, 400, 500, 600, 700, etc.).

The following examples pertain to further embodiments. Example 1 is a communication module that includes a die having a transceiver and a phase shifter die that is coupled to the die. The phase shifter die includes a power combiner and splitter. The communication module also includes a substrate that is coupled to the phase shifter die. The substrate includes an antenna unit with steerable beam forming capability for transmitting and receiving communications.

In example 2, the subject matter of example 1 can optionally include the transceiver having a single transmit and receive chain formed in a silicon based die with complementary metal-oxide-semiconductor (CMOS) circuitry.

In example 3, the subject matter of any of examples 1-2 can optionally include the single transmit and receive chain having switches for switching between transmit and receive modes, an local-oscillator generator to generate an output frequency, a converter (e.g., up and down converter having intermediate frequency (IF) amplifiers and mixers), a power amplifier for amplifying signals, and a low noise amplifier amplifying signals without adding noise.

In example 4, the subject matter of any of examples 1-3 can optionally include the single transmit and receive chain comprises a single receive path during a receive mode and a single transmit path during a transmit mode.

In example 5, the subject matter of any of examples 1-4 can optionally include, during a transmit mode, at least one output signal being amplified by the power amplifier to generate at least one amplified signal that is split by the power splitter into signals to be amplified by N different amplifiers. Then the amplified signals are sent to phase shifters of the phase shifter die which generates phase shifted signals to define an electromagnetic beam that emanates from antennas of the antenna unit.

In example 6, the subject matter of any of examples 1-5 can optionally include, during a receive mode, the power combiner upon receiving signals via the phase shifters and antennas being configured to combine the signals which are sent to the low noise amplifier for amplification.

In example 7, the subject matter of any of examples 1-6 can optionally include the phase shifter die further comprising phase shifters coupled to the power combiner and splitter. The phase shifters receive control signals from a control unit of the die.

Example 8 is a microelectronic device that includes a first die having a first portion of a transceiver, a second die having a second portion of the transceiver, and a third die coupled to the second die. The third die having a power combiner and splitter. The microelectronic device also including a substrate coupled to the third die. The substrate includes an antenna unit with steerable beam forming capability for transmitting and receiving communications.

In example 9, the subject matter of example 8 can optionally include the transceiver having a single transmit and receive chain with the first portion of the transceiver being formed in the first die that comprises silicon and the second portion of the transceiver being formed in the second die that comprises a compound semiconductor material (e.g., group III-V material, GaN, etc.).

In example 10, the subject matter of any of examples 8-9 can optionally include the first portion of the transceiver including a switch for switching between transmit and receive modes, a local-oscillator generator to generate an output frequency, and a converter (e.g., up and down converter having intermediate frequency (IF) amplifiers and mixers).

In example 11, the subject matter of any of examples 8-10 can optionally include the second portion of the transceiver including a power amplifier for amplifying signals and a low noise amplifier for amplifying signals without adding noise.

In example 12, the subject matter of any of examples 8-11 can optionally include the single transmit and receive chain comprising a single receive path during a receive mode and a single transmit path during a transmit mode.

In example 13, the subject matter of any of examples 8-12 can optionally include, during a transmit mode, at least one output signal being amplified by the power amplifier to generate at least one amplified signal that is split by the power splitter into signals to be amplified by N different amplifiers. Then, the amplified signals are sent to phase shifters of the phase shifter die which generate phase shifted signals to define an electromagnetic beam that emanates from antennas of the antenna unit.

In example 14, the subject matter of any of examples 8-13 can optionally include, during a receive mode, the power combiner upon receiving signals via the phase shifters and antennas being configured to combine the signals which are sent to the low noise amplifier for amplification.

In example 15, the subject matter of any of examples 8-15 can optionally include the IPD further comprising phase shifters coupled to the power combiner and splitter. The phase shifters receive control signals from a control unit of the die.

In example 16, the subject matter of any of examples 8-14 can optionally include the transceiver further comprising phase shifters coupled to the mixers.

Example 17 is a computing device that includes at least one processor to process data and a communication module or chip that is coupled to the at least one processor. The communication module or chip comprises at least one processor to process data and a communication module or chip coupled to the at least one processor. The communication module or chip comprises a first die having driver circuitry of a transceiver, a second die having amplifier circuitry of the transceiver, and an integrated passive device (IPD) coupled to the second die. The IPD includes a power combiner and splitter. The communication modules also includes a substrate coupled to the IPD. The substrate includes an antenna unit with steerable beam forming capability for transmitting and receiving communications.

In example 18, the subject matter of example 17 optionally includes the first die comprising a silicon based material and the second die comprising a compound semiconductor material.

In example 19, the subject matter of any of examples 17-18 optionally includes the first die, the second die, and the IPD being attached to the substrate.

In example 20, the subject matter of any of examples 17-19 optionally includes the first die and the second die being assembled on the IPD which is coupled to the substrate.

In example 21, the subject matter of any of examples 17-18 optionally includes the first die and the second die are assembled on a first surface of the IPD and a second surface of the IPD is attached to the substrate.

What is claimed is:

1. A communication module comprising:
   a die having a transceiver, wherein the die is a silicon based die;
   a phase shifter die coupled to the die, the phase shifter die having a power combiner and splitter, wherein the phase shifter die is a compound semiconductor based die; and
   a substrate coupled to the phase shifter die, the substrate having an antenna unit with steerable beam forming capability for transmitting and receiving communications.

2. The communication module of claim 1, wherein the transceiver comprises a single transmit and receive chain formed in the silicon based die with complementary metal-oxide-semiconductor (CMOS) circuitry.

3. The communication module of claim 2, wherein the single transmit and receive chain comprises switches for switching between transmit and receive modes, an local-oscillator generator to generate an output frequency, a converter, a power amplifier for amplifying signals, and a low noise amplifier amplifying signals without adding noise.

4. The communication module of claim 3, wherein the single transmit and receive chain comprises a single receive path during a receive mode and a single transmit path during a transmit mode.

5. The communication module of claim 4, wherein during a transmit mode, at least one output signal is amplified by the power amplifier to generate at least one amplified signal that is split by the power splitter into signals to be sent to phase shifters of the phase shifter die which generate phase shifted signals to define an electromagnetic beam that emanates from antennas of the antenna unit.

6. The communication module of claim 4, wherein during a receive mode, the power combiner upon receiving signals via the phase shifters and antennas is configured to combine the signals which are sent to the low noise amplifier for amplification.

7. The communication module of claim 1, wherein the phase shifter die further comprises: phase shifters coupled to the power combiner and splitter, the phase shifters receive control signals from a control unit of the die.

8. A microelectronic device comprising:
   a first die having a first portion of a transceiver, wherein the first die is a silicon based die;
   a second die having a second portion of the transceiver;
   a third die coupled to the second die, the third die having a power combiner and splitter, wherein the third die is a compound semiconductor based die; and
   a substrate coupled to the third die, the substrate having an antenna unit with steerable beam forming capability for transmitting and receiving communications.

9. The microelectronic device of claim 8 wherein the transceiver comprises a single transmit and receive chain with the first portion of the transceiver being formed in the first die and the second portion of the transceiver being formed in the second die that comprises a compound semiconductor material.

10. The microelectronic device of claim 9, wherein the first portion of the transceiver comprises a switch for switching between transmit and receive modes, an local-oscillator generator to generate an output frequency, and a converter.

11. The microelectronic device of claim 9, wherein the second portion of the transceiver comprises a power amplifier for amplifying signals and a low noise amplifier for amplifying signals without adding noise.

12. The microelectronic device of claim 11, wherein the single transmit and receive chain comprises a single receive path during a receive mode and a single transmit path during a transmit mode.

13. The microelectronic device of claim 12, wherein during a transmit mode, at least one output signal is amplified by the power amplifier to generate at least one amplified signal that is split by the power splitter into signals to be sent to phase shifters of the IPD which generate phase shifted signals to define an electromagnetic beam that emanates from antennas of the antenna unit.

14. The microelectronic device of claim 12, wherein during a receive mode, the power combiner upon receiving signals via the phase shifters and antennas is configured to combine the signals which are sent to the low noise amplifier for amplification.

15. The microelectronic device of claim 8, wherein the IPD further comprises: phase shifters coupled to the power combiner and splitter, the phase shifters receive control signals from a control unit of the die.

16. The microelectronic device of claim 8, wherein the transceiver further comprises: phase shifters coupled to the mixers.

17. A computing device comprising:
   at least one processor to process data; and
   a communication module or chip coupled to the at least one processor, the communication module or chip comprises, a first die having driver circuitry of a transceiver, wherein the first die is a silicon based die;

a second die having amplifier circuitry of the transceiver, wherein the second die is a compound semiconductor based die;
an integrated passive device (IPD) coupled to the second die, the IPD having a power combiner and splitter; and
a substrate coupled to the IPD, the substrate having an antenna unit with steerable beam forming capability for transmitting and receiving communications.

18. The computing device of claim 17, wherein the first die, the second die, and the IPD are attached to the substrate.

19. The computing device of claim 17, wherein the first die and the second die are assembled on the IPD which is coupled to the substrate.

20. The computing device of claim 17, wherein the first die and the second die are assembled on a first surface of the IPD and a second surface of the IPD is attached to the substrate.

\* \* \* \* \*